(12) United States Patent
Strogov et al.

(10) Patent No.: US 12,124,596 B2
(45) Date of Patent: Oct. 22, 2024

(54) UNIVERSAL PLATFORM FOR DATA PROTECTION

(71) Applicant: Acronis International GmbH, Schaffhausen (CH)

(72) Inventors: Vladimir Strogov, Singapore (SG); Alexey Sergeev, Kashira (RU); Alexey Kostushko, Yerevan (AM); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 225 days.

(21) Appl. No.: 17/656,880

(22) Filed: Mar. 29, 2022

(65) Prior Publication Data
US 2023/0315881 A1 Oct. 5, 2023

(51) Int. Cl.
*G06F 21/62* (2013.01)
(52) U.S. Cl.
CPC ................. *G06F 21/6218* (2013.01)
(58) Field of Classification Search
CPC .................................................... G06F 21/6218
See application file for complete search history.

(56) References Cited

U.S. PATENT DOCUMENTS

| | | | |
|---|---|---|---|
| 7,475,282 B2 | 1/2009 | Tormasov et al. | |
| 8,849,955 B2 | 9/2014 | Prahlad et al. | |
| 11,023,329 B1 | 6/2021 | Per et al. | |
| 11,249,791 B2 | 2/2022 | Sergeev et al. | |
| 11,550,913 B2 | 1/2023 | Strogov et al. | |
| 11,630,742 B2 | 4/2023 | Strogov et al. | |
| 2011/0271353 A1* | 11/2011 | Li | G06F 3/0622 726/26 |
| 2015/0074409 A1* | 3/2015 | Reid | G06F 21/6218 713/171 |

* cited by examiner

*Primary Examiner* — Khoi V Le
(74) *Attorney, Agent, or Firm* — ESPE Legal Consultancy FZ-LLC

(57) ABSTRACT

The invention relates to data recovery technology. Each created backup is checked for the integrity of the placed files, while calculating the checksums of each block of data that can be restored from the backup. The computer system is restored from a backup copy by connecting it using the archive copy connection driver, which creates a virtual disk that is readable by standard means of the operating system of the computer system being restored. The booting of the operating system is performed from the virtual disk and, after restoring the functioning of the computer system, the system volume that has been damaged is restored from the backup copy to the local storage medium.

20 Claims, 3 Drawing Sheets

UNIVERSAL PLATFORM FOR DATA PROTECTION

FIELD OF THE INVENTION

The invention relates to data recovery technologies, and more specifically, to systems and methods for recovery using a backup image.

BACKGROUND OF THE INVENTION

When an organization or company needs to perform data recovery (such as disaster recovery) on many devices, the speed of recovery can be slow due to the amount of data that needs to be restored for each individual device. The recovery speed determines how quickly a computer system, server, or service can be restored, or how quickly users can access data and services. For example, a banking or email service might not be comfortable with an excessively long recovery time because users might need quick access to their information for critical or time-sensitive actions.

There are ways to increase the recovery speed of a failed system. One of the most popular methods used in the prior art for backup and recovery is to reduce the amount of data that needs to be restored so that only the most important and critical files, programs and data are restored. As a rule, disaster recovery of an operating system and applications is performed using a backup image, an archive file with an image of the system partition, which stores backup data for system recovery, including necessary applications and user files.

In large organizations and companies, data changes frequently, which makes this problem much more challenging. In addition, the number of backups is quite high because hundreds or thousands of servers regularly back up their data. Even a one- or two-day difference between a backup and a virus attack on critical data or failure of a storage medium due to resource exhaustion can significantly affect the relevance of data files, documents, databases, etc.

One possible solution is to determine a first set of files from a plurality of files to be used during recovery of one or more storage devices. The second set of files that will not be used during recovery is flagged. The second set of files that have been flagged are copied to an external storage device, and the first set of files can be stored in a backup image for the computing device. The method can add to the backup image a corresponding link to each of the flagged second set of files on the external storage device.

The disadvantage of this method is the lack of means for reducing the volume of the backup copy or tools that reduce the time to complete the data recovery operation, during which the data is not available to the user. Also, at the time of data recovery from a backup image on the user's computer or functional node, such a method does not ensure the implementation of the primary tasks for which such a restored computer or node was created.

In another possible solution, antivirus scanning of files stored on at least two storage devices is performed. The deduplication engine calculates the corresponding hash for each corresponding file stored on the storage devices. The deduplication engine identifies the first file stored on the storage devices and determines if at least one other copy of the first file exists on the storage devices. In response to determination of another copy, the deduplication module stores the first file in the shared database, replaces all copies of the first file on storage devices with a reference to the first file in the shared database, and performs a virus scan on the first file in the shared database and files stored on storage devices.

But this solution has significant disadvantages, consisting in the absence of tools for checking the consistency of data in the storage devices. Also, at the time of data recovery from a backup image on the user's computer or functional node, the system does not ensure the implementation of the primary tasks for which such a computer or node is intended.

Solutions have attempted to reduce the data volume in a backup image. Such recovery solutions inefficiently spend time recovering files or data that are not needed to initially start up the computer system, or data recovery fails to recover important files. The computer system can contain obsolete files. After restoring the files, those that are outdated must be replaced with newer current versions.

SUMMARY OF THE INVENTION

The invention provides an increase in the speed of computer system operability recovery, even with data damage on the storage medium. A system of and method of backups and the use of backup-recovery software can reduce the amount of time it takes to restore a system. At the same time, it is important to restore, first of all, critically significant files, system files, program files and data, on which the execution of the corresponding priority task by the user's computer or functional unit depends.

One of the main problems in the building of computing systems is the task of ensuring their continuous functioning. This task has three components: reliability, availability and serviceability. All these three components involve a fight against system malfunctions generated by failures and failures in its operation. This fight is waged in all three directions, which are interconnected and applied jointly.

The technical result of the invention is to reduce the recovery time of the computer system in the event of a malfunction, which allows the system to restore functioning after a malfunction is detected. In this case, the malfunction of the computer system is restored from the backup copy of the data and control of the reliability and completeness of the restored data from the backups is provided.

Data on a storage medium can be characterized by qualitative properties: reliability, completeness, accuracy, relevance, usefulness, value, timeliness, comprehensibility, accessibility, conciseness and others.

The following technical features of the data on the data storage medium are essential to the claimed technical result.

Data validity is the property of data and the information encoded in it not to have hidden errors. Valid data can become invalid over time if it becomes outdated and no longer reflects the true value of operations, for example as a result of unauthorized access and modification. Data can become invalid for the following reasons: intentional distortion (misinformation) or unintentional distortion of a subjective nature, or distortion due to the effects of malicious software.

Data completeness is the property of data and the information encoded in it to characterize the displayed object or process in a comprehensive way for a given consumer. Data is complete if it is sufficient to understand and make decisions. Incomplete data may lead to an erroneous conclusion or decision. The completeness of the data on the data storage medium may be compromised by corruption caused by malware.

Data integrity refers to the accuracy and consistency of data throughout its life cycle. Data integrity is an important aspect for the design, implementation, and use of any system that stores, processes, or retrieves data.

Hierarchical Storage Management ("HSM") refers to data storage technology that allows data to be automatically distributed between fast (expensive), slow (cheap) drives, and tiering. Systems with HSM store the bulk of data on slow high-capacity devices, using faster drives as the main platform for running processes.

The HSM system allows data to be relocated between fast local drives and slow long-term data storage devices. Despite the obvious advantages of fast data storage devices, they tend to be too expensive for most organizations. HSM systems transfer unused data to inexpensive remote data storage devices thus minimizing corporate expenses.

The HSM systems store some data in remote storage areas and restore the information if necessary and additionally contains HSM filter driver to monitor the way data is used and make best guesses as to which data can safely be moved to slower devices and which data should stay on the fast devices/

The HSM filter driver constantly monitor file accesses to detect which files safely can be moved to remote storage and which should be stored locally. Files are relocated to remote storage if no access attempts are made for a specified time period. If a user accesses a file stored remotely, the file is transferred back to the local drive. This approach ensures that users can quickly access a volume of data considerably larger than available local disk space.

While moving a file from a local drive to remote storage, the HSM system saves a reference to the actual location of the file. Whenever the corresponding file is accessed, the system determines its location on the backup device. Replacing files with references to their remote storage locations makes it possible to create storage areas of practically unlimited size.

Each tier in the HSM hierarchy represents a different cost and performance pairing. As a file ages and is accessed less often, the system moves it to a slower and less expensive form of storage. A file that has moved to a slower tier can be retrieved and moved back to a higher performing tier if it is needed for more critical workflows.

Tiered storage divides data based on its business value and how often users and applications access it. Data is assigned to a specific storage tier based on these factors. More valuable, frequently used and mission-critical data is assigned to faster, more expensive storage flash Solid State Disks and Storage Class Memory devices. Less important and less frequently used data is archived in the cloud or comparable low-cost storage.

The present invention relates to continuous availability systems, i.e., ensures continuous availability of computer system functioning, eliminating any downtime, both planned and unplanned. The development of such a system covers both hardware and software and allows for on-line upgrade and maintenance. In an embodiment, recovery time after a failure does not exceed one second.

The claimed technical result is achieved by performing the steps of the method for restoring the functioning of a computer system in the event of a malfunction. When performing a backup task using a file filter, the files that are significant for restoring the operability and functioning of the computer system are monitored and the priority of file recovery is fixed in the backup. At the same time, files that affect the operability and functioning during backup are marked for priority backup. Files that are not used by the computer system during functioning are marked as irrelevant when the computer system functioning is restored.

Hierarchical storage management (HSM) is used to store data and automatically distribute data between fast (expensive), slow (cheap) drives or cloud storage, tiering. The systems with HSM provide storage of data that is marked as irrelevant in the restoration of the computer system functioning on slow devices of large volume, using local storage media to store files that affect the operability and functioning of the system, for which they use faster drives as the main process launch sites. The backup archive is stored in cloud storages in the form of a cloud archive or on a local storage medium in a local archive. The machine learning subsystem uses a file filter to analyze the history of using files and the frequency of obtaining access to files and forms a map of files by significance for restoring the computer system operability. A file is considered significant if it is accessed during the booting of the operating system or during normal operation of the computer system. If the file is not accessed during normal operation of the computer system, then the significance of the file is reduced in accordance with the learning algorithms of the machine learning subsystem. The archiving service performs loss free compression of files when performing a backup task and extracts files from the archive when restoring from a backup copy in the process of restoring the functioning of a computer system. When performing a backup task, each created backup is checked for the integrity of the placed files, while calculating the checksums of each data block that can be restored from the backup. Backups that are stored on cloud storages are checked for integrity by calculating the checksum of the backup metadata. Integrity checking checks the physical location of the data in the backup and confirms the suitability of the data in the backup for recovery from such a backup. If it is necessary to restore the operability of a computer system from a backup, connect it using the archive copy connection driver using the backup archive connection interface located on a local storage medium or in cloud storages of information; The driver for connecting an archive copy creates a virtual disk that is readable by standard means of the operating system of the computer system being restored. The booting of the operating system is performed from the virtual disk and, after restoring the functioning of a computer system, the system volume that has been damaged is restored from the backup copy to the local storage medium.

In one embodiment, the computer system operability is compromised by malware. An example in which the computer system operability needs to be restored to working order is the result of an anti-virus scan, which made it possible to detect a virus attack, as a result of which a service disruption occurred.

In one embodiment, the operability of the computer system is affected by the failure of the physical storage media used in the computer system. At the same time, the system and method for restoring the functioning of a computer system provide automatic restoration of operability. And after booting the operating system, to restore from an archive copy, a new local storage medium of the system volume is used. In this case, the archive is a chain of data grouped into a summary dataset that is processed when the files are backed up under the control of a separate backup task.

A backup slice consists of sets of data blocks related to modified files. A backup slice is created in a single loop from the time an individual backup task is started until it is completed. The number of backup slices created equals the number of runs per backup task. The backup slice is used to restore the state of the files to the point in time when the backup slice was created.

A media volume is an archive backup file with a *.tib extension that contains slices of backups. Each backup slice contains sets of data blocks from one or more media volumes. If the backup task settings are set to split an archive file, the backup slice to be created is split into several files. In doing so, the files created are multiple volumes of the backup slice.

In one embodiment, the archive copy connection driver creates a virtual disc using a backup slice.

Through the file filter, file access operations are tracked, such as reading, viewing, modifying, creating, executing, and fixing changes made to files. In this case, the file filter is an operating system loader level driver or a storage medium volume driver in a computer system.

The present invention discloses a method that is implemented in a system for restoring the functioning of a computer system in the event of a malfunction, containing a hardware processor, RAM and a set of instructions, upon execution of which the steps of the method for restoring the functioning of a computer system in the event of a malfunction are implemented. Said instruction set is stored in a non-volatile storage medium that is connected to the processor via a system bus.

DETAILED DESCRIPTION

Disclosed in the description, examples of implementation of specific systems in certain embodiments of the invention can be performed in numerous ways, including a system, process, device, user interface, or a sequence of machine instructions or program instructions on a computer-readable medium, in a network of computers, where program instructions are sent over optical, electronic or wireless communication channels. In general, the steps of the methods can be carried out in any order to implement the invention, unless the claims state otherwise.

Figure 1:
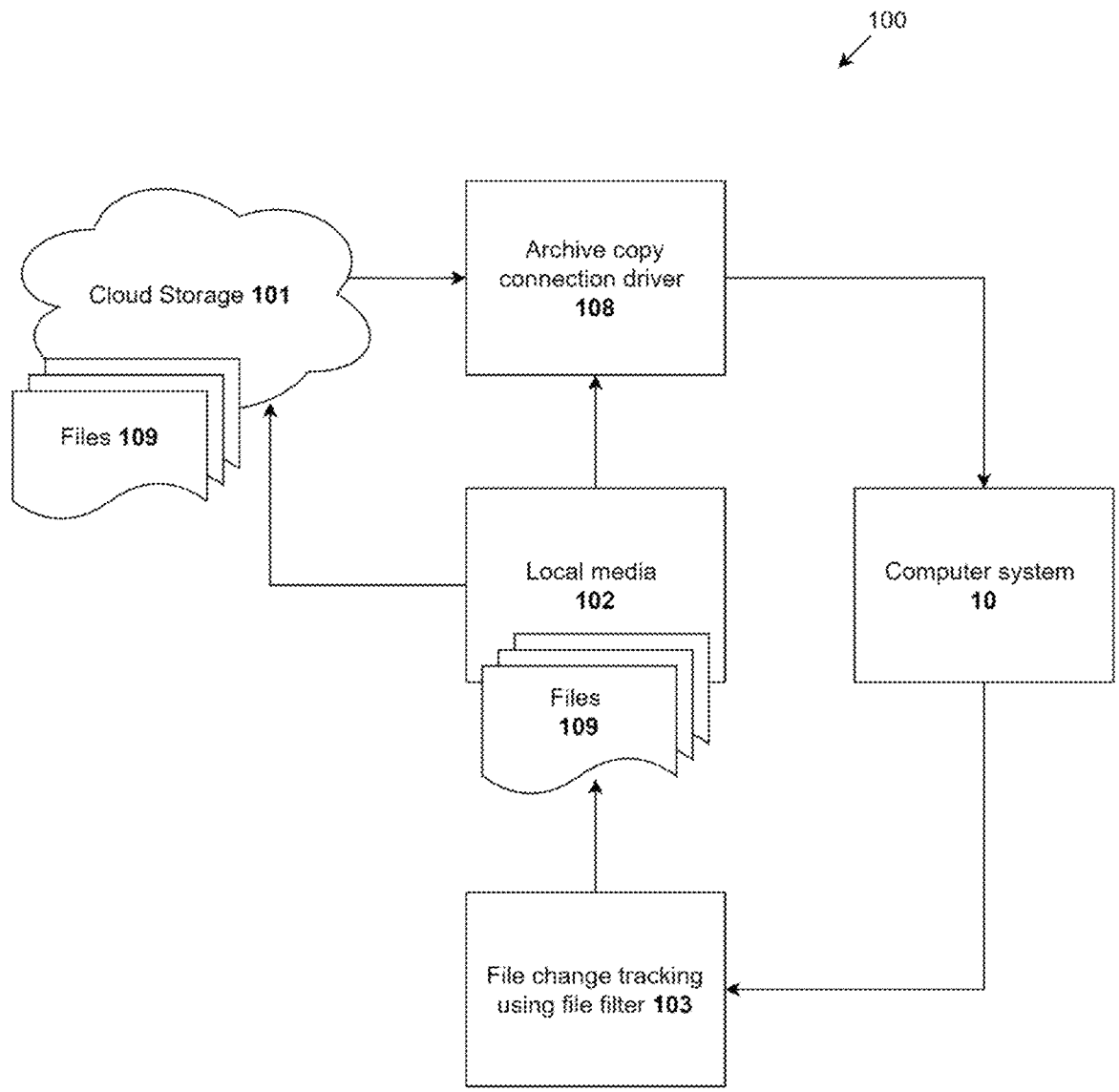
FIG. 1 shows a flow diagram of the system for computer system functioning restoration in case of malfunctioning.

According to FIG. 1, system 100 for restoring the functioning of a computer system 10 in the event of a malfunction comprises a general-purpose computer system 10 or a network-attached device that is scheduled to perform a backup task. The backup archive is stored in the cloud storages 101 as a cloud archive or on a local storage medium 102 as a local archive.

During a single execution of a backup task, a backup slice is formed, which consists of sets of data blocks related to modified files. The backup slice copy is used to restore files to the state at the time the backup slice was created, if necessary.

The system 100 for restoring the functioning of a computer system in case of detection of a malfunction includes a computing device 10 in which a scheduled backup task is performed, while the backup is performed using a file filter 103 that monitors files that are significant for restoring the operability and functioning of the computer system. The backup fixes the priority of file restoration.

In one embodiment, hierarchical storage management ("HSM") is used to store data and automatically distribute data between fast, slow drives.

Each tier in the HSM hierarchy represents a different cost and performance pairing. The HSM filter driver 105 monitors file ages and file access statistics and determines to move one to a slower and less expensive form of storage.

A file that has moved to a slower tier can be retrieved and moved back to a higher performing tier if it is needed for more critical workflows. Administrators set data governance policies that manage how data moves among the tiers. Once the policies are set, the HSM software manages the data itself.

In one embodiment, the file filter 103 includes a machine learning engine to analyze file usage history and frequency of accessing files and generate a map of files by importance for restoring computer system operability 10.

The backup copy is archived using the HSM filter driver 105 according to the importance map of files, into the cloud storages 101 in the form of a cloud archive 109 or on a local storage media 102 in the local archive 109.

The archiving service is made with a possibility of a loss-free compression of files when performing a backup task and extracts files from the archive when restoring from a backup copy in the process of restoring the functioning of a computer system 10.

When performing a backup task, each created backup is checked for the integrity of the placed files, while calculating the checksums of each block of data that can be restored from the backup 109.

If it is necessary to restore the operability of the computer system 10 from the backup copy 109, it is connected via the archive copy connection driver 108 using the backup archive connection interface 109 located on the local storage medium 102 or in the cloud information storage 101.

The driver for connecting an archive copy 108 creates a virtual disk that is readable by standard means of the operating system of the computer system 10 being restored.

The booting of the operating system is performed from the virtual disk and, after restoring the functioning of a computer system 10, the system volume that has been damaged is restored from the backup copy to the local storage medium.

In one embodiment, the anti-virus application performs an anti-virus check and detects and prevents a virus attack or the execution of a malicious application. As the antivirus application accesses the backup slice 109 via the backup driver 108, the antivirus application then uses standard operating system tools to access files and data blocks. In this case, if malware is detected and successfully removed, or if data damage that was caused by a virus attack is restored, the corresponding corrections will be automatically made to the backup slice using the archive copy connection driver 108.

Figure 2:
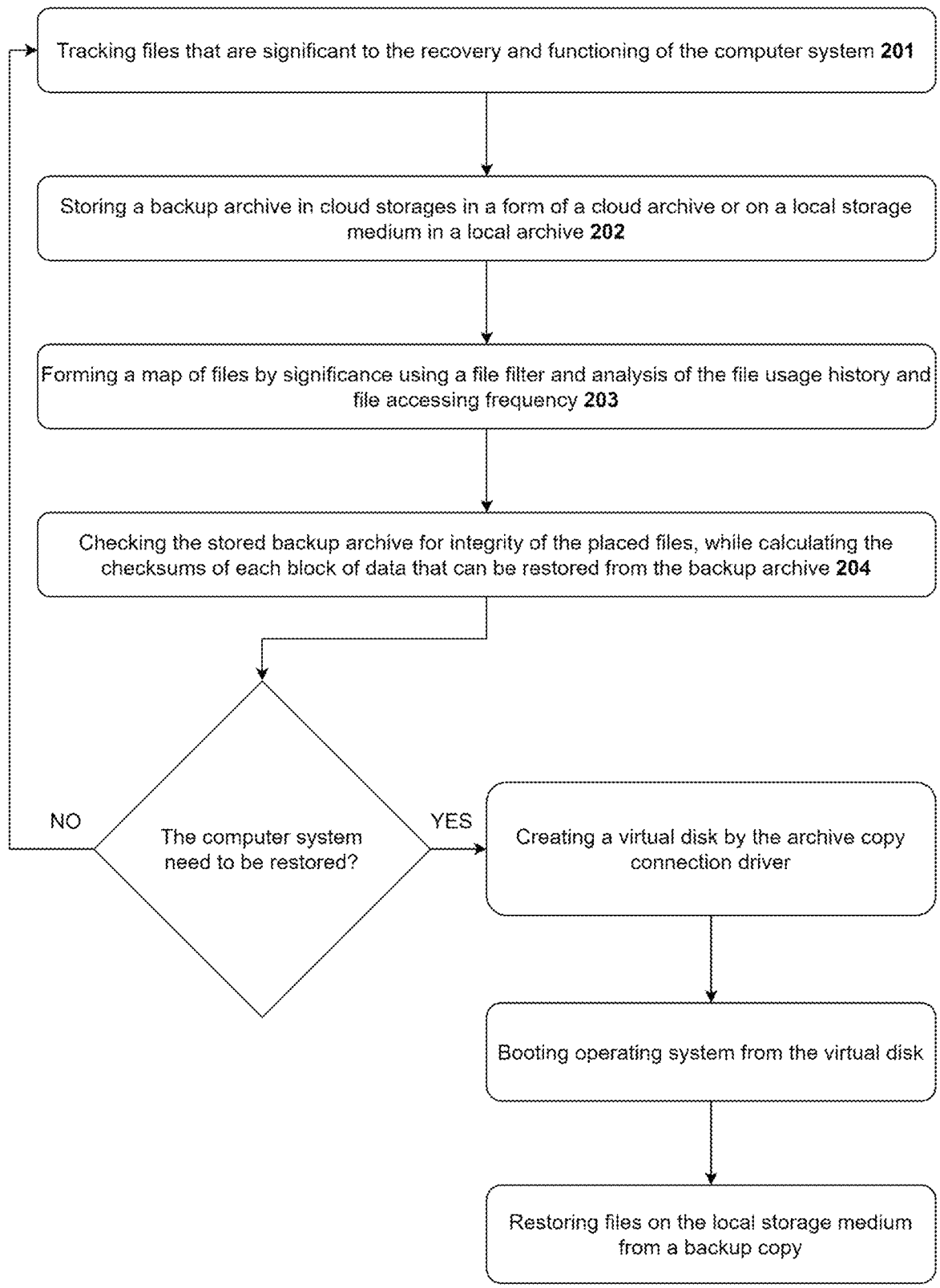
FIG. 2 shows a flow diagram of the sequence of operations when saving data to the archive and when reading data in the system for computer system functioning restoration in case of malfunctioning is shown.

According to FIG. 2 the method for computer system functioning restoration in case of malfunctioning 200 provides for the following stages.

When performing a backup task using a file filter, the files 201 that are significant for restoring the operability and functioning of the computer system are monitored and the priority of file recovery is fixed in the backup.

At the stage 202, the backup archive is stored in cloud storages in the form of a cloud archive or on a local storage medium in a local archive. At the same time, the machine learning subsystem uses a file filter to analyze the history of using files and the frequency of obtaining access to files and forms a map of files 203 by significance for restoring the computer system.

When performing a backup task, each created backup is checked for the integrity of the placed files 204, while calculating the checksums of each block of data that can be restored from the backup.

If it is necessary to restore the operability of a computer system 205 from a backup, connect it using the archive copy connection driver using the backup archive connection interface located on a local storage medium or in cloud storages of information.

At the stage 206, the driver for connecting an archive copy creates a virtual disk that is readable by standard means of the operating system of the computer system being restored. The booting of the operating system is performed from the virtual disk 207 and, after restoring the functioning of a computer system, the system volume 208 that has been damaged is restored from the backup copy to the local storage medium.

In one embodiment, an additional stage is implemented, at which the archiving service performs loss-free compression of files when performing a backup task and extracts files from the archive when restoring from a backup copy in the process of restoring the functioning of a computer system.

In one embodiment, in a method for restoring the functioning of a computer system, files that affect the operability and functioning of a backup are marked for priority backup, and files that are not used by the computer system during functioning are marked as irrelevant when the functioning of the computer system is restored.

In one embodiment, a computer system recovery method uses hierarchical storage management (HSM) to store data and automatically distribute data between fast and slow drives and store data that is marked as irrelevant when restoring a computer system to slow devices of large volume, using local storage media to store files that affect the performance and functioning of the system.

Figure 3:
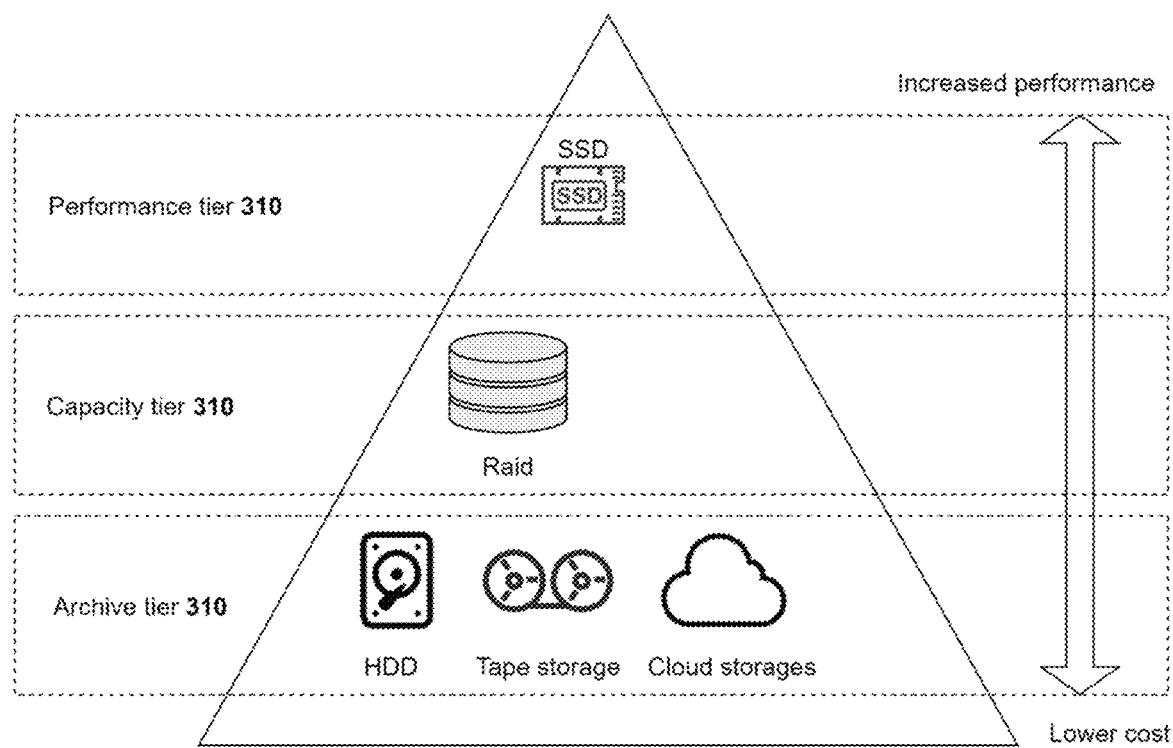
FIG. 3 shows a flow diagram of data storages, which are used in the system for computer system functioning restoration in case of malfunctioning.

According to FIG. 3, hierarchical storage management (HSM) is used to store data and automatically distribute data between fast, slow drives.

An analysis of the data stored in the storage system shows that some data is much more in demand. When data becomes obsolete, the frequency of access to it decreases sharply. There comes a time when this data becomes unclaimed. At the same time, the volume of storage of this data increases over time. This leads to the need to move data, depending on its demand, between different physical storage devices, since basically all data is stored on expensive and high-performance hard disk-based storage systems. Hierarchical storage management (HSM) supports Multi-Tier Storage Architecture and moves data to the appropriate storage tier based on its state and combines the benefits of different storage technologies (hard disk, tape and optical media).

As shown in FIG. 3, there are three data storage tiers 300. Performance tier 310 refers to storage devices with the highest performance and cost, such as solid-state disk, (SSD) and Redundant Array of Independent Disks (RAIS) arrays. Capacity tiers 320 refer to storage devices that have large amounts of storage, such as SATA hard drives. This tier is typically used to move data out of the performance tier and is less performant. Archival tier 330 refers to devices for long-term storage, implemented on the basis of robotic optical or tape drives.

The invention claimed is:

1. A system for restoring a computer system having an interface for accessing a backup archive and an interface for connecting the backup archive, comprising:
   a file filter for performing a backup task;
   a monitor of a plurality of files that are required for restoring the operability and functioning of the computer system the priority of file recovery in the backup archive;
   wherein the backup archive is stored in a cloud archive or on a local memory in a local archive;
   a machine learning subsystem configured to analyze the history of using files and the frequency of obtaining access to files and forms a map of files by significance for restoring the computer system;
   the machine learning subsystem further configured to check each created backup for the integrity of the placed files, while calculating the checksums of each block of data that can be restored from the backup;
   an archive copy connection driver for restoring the operability of a computer system from a backup using the backup archive connection interface located on the local memory or in cloud storages of information;
   the driver for correcting an archive copy creates a virtual disk that is readable by standard means of the operating system of the computer system being stored;
   a virtual disk for booting the operating system and,
   a backup of the local memory for restoring a system volume that has been damaged, thereby reducing downtime of the computer system after damage to the system volume.

2. The system according to claim 1, in which files that affect the operability and functioning during backup are marked for priority backup, and files that are not used by the computer system during functioning are marked as irrelevant when the computer system is restored.

3. The system according to claim 1, further comprising a hierarchical storage management filter driver to monitor the way data is used which uses hierarchical storage management for data storage and automatic distribution of data between fast and slow drives, provides storage of data that is marked as not important when restoring the functioning of a computer system, on slow devices of a large volume, using local storage media to store files that affect the performance and functioning of the system.

4. The system according to claim 1, in which the machine learning subsystem accepts the file as required if it is accessed during the booting of the operating system or during the normal operation of the computer system, while if the file is not accessed during is not accessed during the normal operation of the computer system then the significance of the file reduces in accordance with the learning algorithms of the machine learning system.

5. The system according to claim 1, in which the recovery of the computer system is associated with violations caused by malware or is associated with the result of an antivirus scan, or is caused by a virus attack, as a result of which the operability of computer system services is disrupted.

6. The system according to claim 1, in which the performance of a computer system is impaired if the physical storage medium used in the computer system fails, while the system and method for restoring the functioning of a computer system provide automatic recovery, and after booting the operating system to restore from the archive the copies use the new local media of the system volume.

7. The system of claim 1, wherein at least one of the files is replaced with a reference to the at least one of the files on a remote storage location.

8. The system of claim 7, wherein files at the remote storage location are stored across at least two drives including a first physical drive for high priority files and a second physical drive for low priority files.

9. The system of claim 1, wherein the file filter is configured to track file access operations for the plurality of files.

10. The system of claim 1, wherein restoring the computer system does not exceed one second.

11. A computer implemented method for restoring the functioning of a computer system in the event of a malfunction, the method comprising:
- performing a backup task using a file filter, wherein the files that are required for restoring the operability and functioning of the computer system are monitored and the priority of file recovery is fixed in the backup archive;
- storing the backup archive in cloud storages in the form of a cloud archive or on a local storage medium in the local archive;
- forming a map of files using a machine learning subsystem, wherein machine learning subsystem uses a file filter to analyze the history of files usage and the frequency of obtaining access to files and forms a map of files by significance for restoring the computer system;
- checking the backup archive for integrity of the placed files during the backup task, wherein the integrity check is performed by calculating the checksums of each block of data that can be restored from the backup; and
- restoring the operability of a computer system from the backup archive, comprising:
- connecting to backup archive using the driver for connecting an archive copy via the backup archive connection interface located on a local storage medium or in cloud storages for information;
- creating a virtual disk using the driver for connecting an archive copy that is readable by standard means of the operating system of the computer system being restored;
- booting of the operating system from the virtual disk; and
- restoring from the backup archive to the local storage medium the system volume that has been damaged after restoring the functioning of the computer system is completed, thereby reducing downtime of the computer system after damage to the system volume.

12. The method according to claim 11, in which files that affect the operability and functioning during backup are marked for priority backup, and files that are not used by the computer system during functioning are marked as irrelevant when the computer system functioning is restored.

13. The method according to claim 11, which uses hierarchical storage management for data storage and automatic distribution of data between fast and slow drives, provides storage of data that is marked as not important when restoring the functioning of a computer system, on slow devices of a large volume, using local storage media to store files that affect the performance and functioning of the system.

14. The method according to claim 11, in which the machine learning subsystem accepts the file as required if it is accessed during the booting of the operating system or during the normal operation of the computer system, while if the file is not accessed during the normal operation of the computer system, then the significance of the file reduces in accordance with the learning algorithms of the machine learning subsystem.

15. The method according to claim 11, in which the recovery of the computer system is associated with violations caused by malware or is associated with the result of an antivirus scan, or is caused by a virus attack, as a result of which the operability of computer system services is disrupted.

16. The method according to claim 11, in which the performance of a computer system is impaired in the physical storage medium used in the computer systems fails, while the system and method for restoring the functioning of the computer system provide automatic recovery, and after booting the operating system to restore from the archive the copies use the new local media of the system volume.

17. The method of claim 11, wherein at least one of the files is replaced with a reference to the at least one of the files on a remote storage location.

18. The method of claim 17, wherein files at the remote storage location are stored across at least two drives including a first physical drive for high priority files and a second physical drive for low priority files.

19. The method of claim 11, wherein the file filter is configured to track file access operations for the files.

20. The method of claim 11, wherein restoring the functioning of the computer system does not exceed one second.

* * * * *